United States Patent
Mo

(10) Patent No.: US 6,305,026 B1
(45) Date of Patent: Oct. 23, 2001

(54) CAP WITH HEADPHONES ASSEMBLY

(76) Inventor: Chung Mo, 11185 Anderson Lakes Pkwy. #133, Eden Prairie, MN (US) 55344

( * ) Notice: Subject to any disclaimer, the term of this patent is extended or adjusted under 35 U.S.C. 154(b) by 0 days.

(21) Appl. No.: 09/282,927

(22) Filed: Apr. 1, 1999

(51) Int. Cl.[7] ........................................ A42B 1/24
(52) U.S. Cl. ............................ 2/209.13; 2/209.12
(58) Field of Search ...................... 2/209.13, 175.1, 2/195.1, 209.12; 381/187, 183; 455/149

(56) References Cited

U.S. PATENT DOCUMENTS

| | | | | |
|---|---|---|---|---|
| 510,746 | * | 4/1893 | Gelber | 455/344 |
| 4,776,044 | * | 10/1988 | Makins | 2/199 |
| 4,858,248 | * | 8/1989 | Goldsmith | 2/209.1 |
| 5,265,165 | * | 11/1993 | Rauch | 2/209.13 |
| 5,303,426 | * | 4/1994 | Jones | 2/181 |
| 5,438,698 | * | 8/1995 | Burton et al. | 2/209.13 |
| 5,881,390 | * | 3/1999 | Young | 2/209.13 |

* cited by examiner

*Primary Examiner*—Bibhu Mohanty

(57) ABSTRACT

A cap with headphones assembly for providing a cap with removable headphones for permitting a user to listen to sound generating device connected to the headphones. The cap with headphones assembly includes an article of headwear with a pair of side regions and a bottom opening for receiving a head of a user therein. A pair of ear pieces are provided each having an elongate arm outwardly extending therefrom. Each of the arms has a free end opposite the associated ear piece which is pivotally coupled to an associated side regions. A first of the ear pieces has radio provided therein. Each of the ear pieces has a speaker electrically connected to the radio.

8 Claims, 2 Drawing Sheets

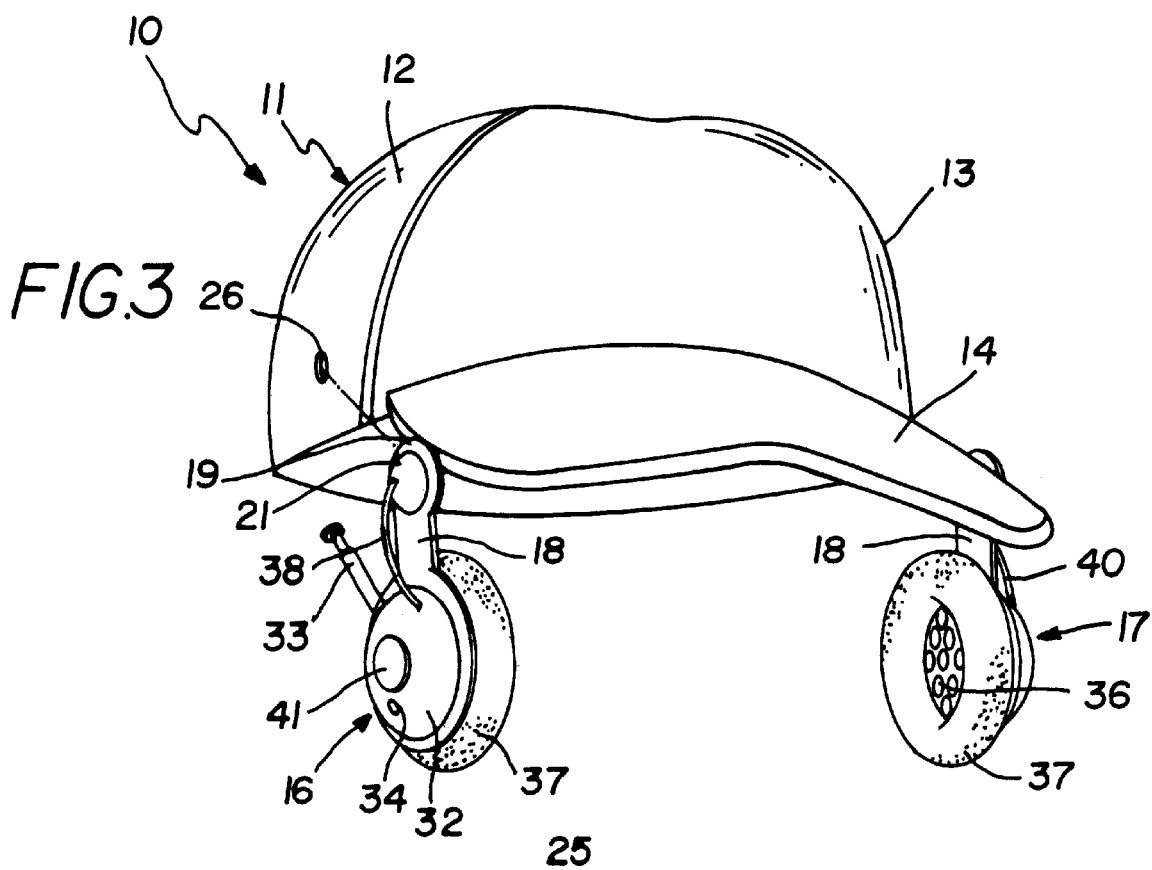
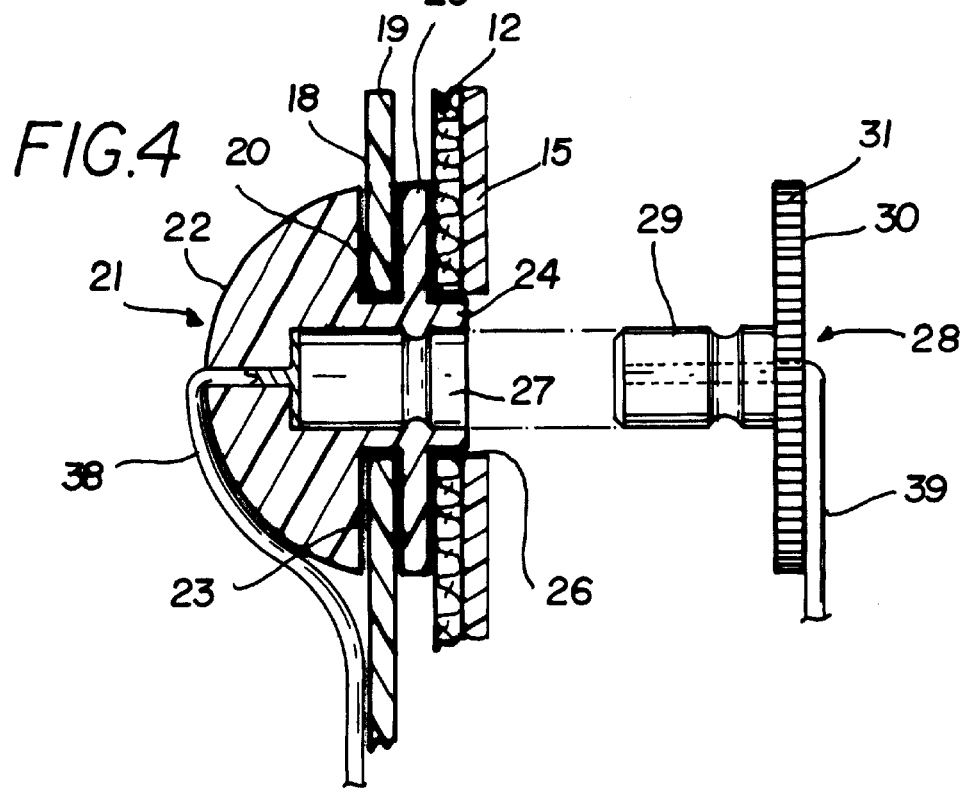

CAP WITH HEADPHONES ASSEMBLY

BACKGROUND OF THE INVENTION

1. Field of the Invention

The present invention relates to cap with headphones assemblies and more particularly pertains to a new cap with headphones assembly for providing a cap with removable headphones for permitting a user to listen to sound generating device connected to the headphones.

2. Description of the Prior Art

The use of cap with headphones assemblies is known in the prior art. More specifically, cap with headphones assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,858,248 BY Goldsmith et al.; U.S. Pat. No. 4,776,044 by Makins; U.S. Pat. No. 4,864,619 by Spates; U.S. Pat. No. Des. 378,158 by Casey; U.S. Pat. No. 3,297,832 by Brown; and U.S. Pat. No. 2,856,466 by Gustafson.

While these devices fulfill their respective, particular objectives and requirements, the aforementioned patents do not disclose a new cap with headphones assembly. The inventive device includes an article of headwear with a pair of side regions and a bottom opening for receiving a head of i user therein. A pair of ear pieces are provided each having an elongate arm outwardly extending therefrom. Each of the arms has a free end opposite the associated ear piece which is pivotally coupled to an associated side regions. A first of the ear pieces has radio provided therein. Each of the ear pieces has a speaker electrically connected to the radio.

In these respects, the cap with headphones assembly according to the present invention substantially departs from the conventional concepts and designs of the prior art, and in so doing provides an apparatus primarily developed for the purpose of providing a cap with removable headphones for permitting a user to listen to sound generating device connected to the headphones.

SUMMARY OF THE INVENTION

In view of the foregoing disadvantages inherent in the known types of cap with headphones assemblies now present in the prior art, the present invention provides a new cap with headphones assembly construction wherein the same can be utilized for providing a cap with removable headphones for permitting a user to listen to sound generating device connected to the headphones.

The general purpose of the present invention, which will be described subsequently in greater detail, is to provide a new cap with headphones assembly apparatus and method which has many of the advantages of the cap with headphones assemblies mentioned heretofore and many novel features that result In a new cap with headphones assembly which is not anticipated, rendered obvious, suggested, or even implied by any of the prior art cap with headphones assemblies, either alone or in any combination thereof.

To attain this, the present invention gene rally comprises an article of headwear with a pair of side regions and a bottom opening for receiving a head of a user therein. A pair of ear pieces are provided each having an elongate arm outwardly extending therefrom. Each of the arms has a free end opposite the associated ear piece which is pivotally coupled to an associated side regions. A first of the ear pieces has radio provided therein. Each of the ear pieces has a speaker electrically connected to the radio.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cap with headphones assembly apparatus and method which has many of the advantages of the cap with headphones assemblies mentioned heretofore and many novel features that result in a new cap with headphones assembly which is not anticipated, rendered obvious, suggested, or even implied by any of the prior art cap with headphones assemblies, either alone or in any combination thereof.

It is another object of the present invention to provide a new cap with headphones assembly which may be easily and efficiently manufactured and marketed.

It is a further object of the present invention to provide a new cap with headphones assembly which is of a durable and reliable construction.

An even further object of the present invention is to provide a new cap with headphones assembly which is susceptible of a low cost of manufacture with regard to both materials and labor, and which accordingly is then susceptible of low prices of sale to the consuming public, thereby making such cap with headphones assembly economically available to the buying public.

Still yet another object of the present invention is to provide a new cap with headphones assembly which provides in the apparatuses and methods of the prior art some of the advantages thereof, while simultaneously overcoming some of the disadvantages normally associated therewith.

Still another object of the present invention is to provide a new cap with headphones assembly for providing a cap with removable headphones for permitting a user to listen to sound generating device connected to the headphones.

Yet another object of the present invention is to provide a new cap with headphones assembly which includes an article of headwear with a pair of side regions and a bottom opening for receiving a head of a user therein. A pair of ear pieces are provided each having an elongate arm outwardly extending therefrom. Each of the arms has a free end opposite the associated ear piece which is pivotally coupled to an associated side regions. A first of the ear pieces has radio provided therein. Each of the ear pieces has a speaker electrically connected to the radio.

Still yet another object of the present invention is to provide a new cap with headphones assembly that has headphones that may also be pivoted out of the way when not in use.

Even still another object of the present invention is to provide a new cap with headphones assembly that may be worn as a normal cap when the headphones are detached.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic exploded front perspective view of the present invention.

FIG. 4 is a schematic cross sectional view taken from line 4—4 on FIG. 2.

DESCRIPTION OF THE PREFERRED EMBODIMENT

Figure 1:
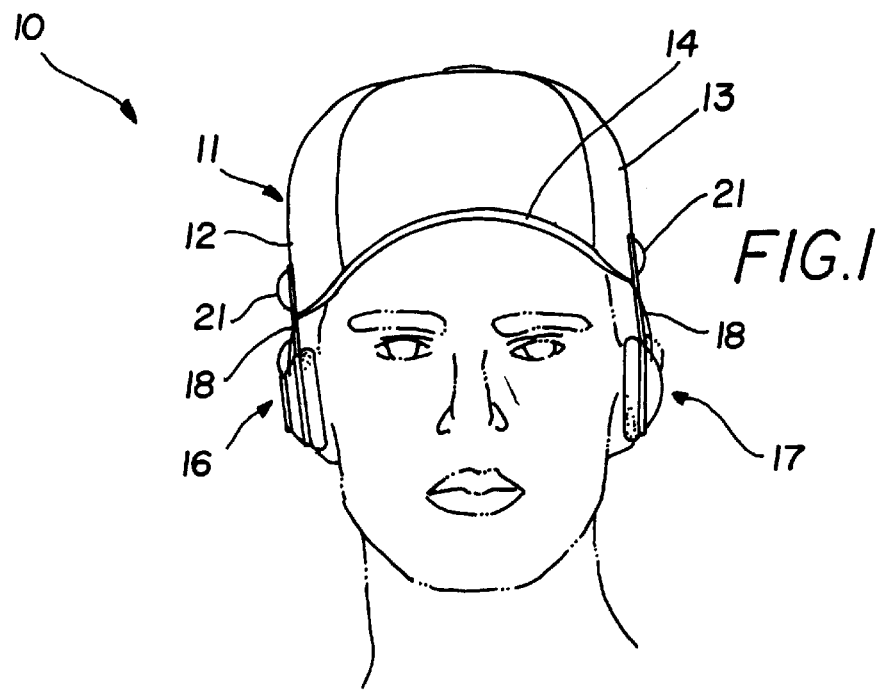
FIG. 1 is a schematic front view of a new cap with headphones assembly in use on a user's head according to the present invention.

With reference now to the drawings, and in particular to FIGS. 1 through 4 thereof, a new cap with headphones assembly embodying the principles and concepts of the present invention and generally designated by the reference numeral 10 will be described.

As best illustrated in FIGS. 1 through 4, the cap with headphones assembly 10 generally comprises an article of headwear with a pair of side regions and a bottom opening for receiving a head of a user therein. A pair of ear pieces ire provided each having an elongate arm outwardly extending therefrom. Each of the arms has a free end opposite the associated ear piece which is pivotally coupled to an associated side regions. A first of the ear pieces has radio provided therein. Each of the ear pieces has a speaker electrically connected to the radio.

In closer detail, the assembly 10 comprises an article of headwear comprising a cap 11 has a pair of regions 12,13, a bill 14 forwardly extending from a front region of the cap and a bottom opening designed for receiving a head of a user therein. Each of the side regions of the cap preferably has a generally rigid interior reinforcing panel 15 therein as illustrated in FIG. 4. Ideally, the interior reinforcing panels each has a thickness about equal to a thickness of the material of the cap so that the overall thickness of the cap is doubled in the side regions at the interior reinforcing panels.

Figure 2:
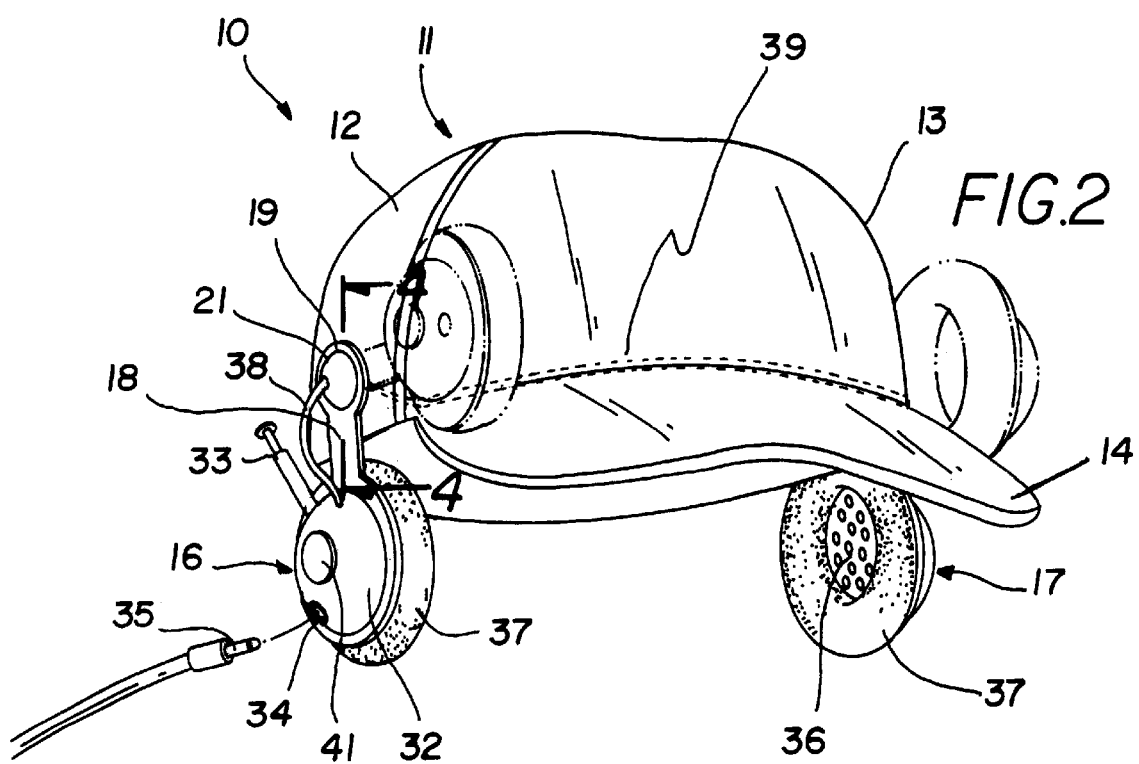
FIG. 2 is a schematic front perspective view of the present invention illustrating the raised and lowered positions of the ear pieces.

A pair of generally disk shaped ear pieces 16,17 are provided for placement adjacent the ear of a user as illustrated in FIG. 1. Each of the ear pieces has an elongate arm 18 outwardly extending therefrom with each of the arms having a free end 19 opposite the associated ear piece. As illustrated in FIG. 2, the free end of one of the ear pieces is pivotally coupled to one of the side regions of the cap and the free end of the another of the ear pieces is pivotally coupled to another of the side regions of the cap.

With reference to FIG. 4, preferably the arms each have a hole 20 therethrough adjacent the free end of the respective arm. A pair of generally hemispherical pivot studs 21 are provided each having a generally hemispherical arcuate face 22 and a substantially planar and generally circular flat face 23. The flat face of each pivot stud has an generally cylindrical extent 24 outwardly extending therefrom at a center of the respective flat face. The extent of each pivot stud terminates at a free tip and has a generally circular flange 25 outwardly radiating therefrom and spaced apart from the tip of the respective extent and spaced apart from the associated flat face of the respective pivot stud. As shown in FIG. 4, the extent of each pivot stud is extended through the hole of the associated arm such that the associated arm is positioned between the flange of the respective extent and the associated flat face of the respective pivot stud to permit free rotation of each arm about the associated extent.

As best illustrated in FIGS. 3 and 4, each of the side regions of the cap has a hole 26 extending therethrough and the associated reinforcing panel of the respective side region. A first of the extents is inserted into the hole of a first of the side regions of the cap to connect a first of the arms to the first side region and a second of the extents is inserted into the hole of a second of the side regions of the cap to connect a second of the arms to the second side region.

Preferably, the tip of each extent has a connecting bore 27 therein. A pair of connectors 28 are provided each having an insertion portion 29 and a generally disk-shaped head portion 30. The insertion portion of one of the connectors is inserted into the connecting bore of one of the extents to connect the extent to the associated side region while the insertion portion of another of the connectors is inserted into the connecting bore of another of the extents to connect the extent to the associated side region. The head portions each preferably have an outer perimeter with a plurality of ridges 31 for frictionally enhancing contact when a user grasps the respective head portion.

A first of the ear pieces has radio 32 provided therein. The first ear piece also preferably has a telescopically extendable antenna 33 outwardly extending therefrom and electrically connected to the radio. The first ear piece ideally also has a jack 34 therein receiving a plug 35 to electrically connect the radio to another input device such as a tape player or CD-player.

Each of the ear pieces also has a speaker 36 for projecting a sound therefrom. Preferably, each of the ear pieces has an annular pad 37 around the speaker designed for abutting an ear region of a user. The pads of the ear pieces each ideally comprise a resiliently deformable foamed material for providing comfort on the ears of the user. The radio is electrically connected to the speakers such that sounds generated by the radio are projected by the speakers. An electrically conductive first cable 38 is electrically connected to and extended from the radio to the pivot stud of the arm of the first ear piece. As illustrated in FIG. 4, the first cable has a free end extending into the connecting bore of extent of the pivot stud of the arm of the first ear piece. An electrically conductive second cable 39 is provided having a first end extending into the insertion portion of a first of the connectors and a second end extending into the insertion portion of a second of the connectors in a manner shown in FIG. 4. The second cable is coupled to the cap along a front portion of an outer perimeter of the bottom opening of the cap adjacent the bill of the cap, preferably, inside the headband of the cap extending around the outer perimeter of the bottom opening of the cap. The first end of the second cable is electrically connected to the free end of the first cable. An electrically conductive third cable 40 is electrically connected to and extended from the speaker of the second ear piece. Like the first cable, the third cable has a free end extending into the connecting bore of extent of the pivot stud of the arm of the second ear piece. The second end of the second cable is electrically connected to the free end of the second cable to electrically connect the speaker of the second ear piece to the radio.

Ideally, the radio has a controller 41 for controlling the band frequency and volume of the speakers on the first ear piece.

In use, the arms are pivotable with respect to the cap between raised and lower positions as illustrated in FIG. 2. The ear pieces depend from the cap and are positioned in a position adjacent the ears of the user when the arms are pivoted to the lowered positions as illustrated in FIG. 1. As best shown in FIG. 2, the ear pieces forwardly extend from the cap and are positioned in a position away from the ears of the user when the arms are pivoted to the raised positions.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An assembly, comprising:

an article of headwear having a pair of side regions and a bottom opening adapted for receiving a head of a user therein;

a pair of ear pieces each having an elongate arm outwardly extending therefrom, each of said arms having a free end opposite the associated ear piece;

said free end of one of said ear pieces being pivotally coupled to one of said side regions, said free end of the another of said ear pieces being pivotally coupled to another of said side regions;

a first of said ear pieces having radio provided therein; and each of said ear pieces having a speaker electrically connected to said radio.

2. The assembly of claim 1, wherein said article of headwear comprises a cap having an outwardly extending bill.

3. The assembly of claim 1, wherein said arms each has a hole therethrough adjacent said free end of the respective arm, further comprising a pair of pivot studs each having an arcuate face and a flat face, said flat face of each pivot stud having an extent outwardly extending therefrom, said extent of each pivot stud terminating at a free tip and having a generally circular flange outwardly radiating therefrom and spaced apart from the tip of the respective extent and spaced apart the associated flat face of the respective pivot stud, said extent of each pivot stud being extended through said hole of the associated arm such that the associated arm is positioned between said flange of the respective extent and the associated flat face of the respective pivot stud to permit free rotation of each arm about the associated extent.

4. The assembly of claim 3, wherein each of said side regions of said cap has a hole extending therethrough, a first of said extents being inserted into said hole of a first of said side regions of said cap, a second of said extents being inserted into said hole of a second of said side regions of said cap.

5. The assembly of claim 4, wherein each of said side regions has a reinforcing panel therein adjacent the hole of the respective side region.

6. The assembly of claim 4, wherein said tip of each extent has a connecting bore therein, further comprising a pair of connectors each having an insertion portion and a head portion, said insertion portion of one of said connectors being inserted into said connecting bore of one of said extents, said insertion portion of another of said connectors being inserted into said connecting bore of another of said extents.

7. The assembly of claim 6, wherein a first cable is electrically connected to and extended from said radio to said pivot stud of said arm of said first ear piece, said first cable having a free end extending into said connecting bore of extent of said pivot stud of said arm of said first ear piece, wherein a second cable has a first end extending into said insertion portion of a first of said connectors and a second end extending into said insertion portion of a second of said connectors, wherein said first end of said second cable is electrically connected to said free end of said first cable, wherein a third cable is electrically connected to and extended from said speaker of said second ear piece, wherein said third cable has a free end extending into said connecting bore of extent of said pivot stud of said arm of said second ear piece, and wherein said second end of said second cable being electrically connected to said free end of said second cable to electrically connect said speaker of said second ear piece to said radio.

8. An assembly, comprising:

an article of headwear comprising a cap having a pair of regions, an outwardly extending bill and a bottom opening adapted for receiving a head of a user therein;

each of said side regions of said cap having a reinforcing panel therein;

a pair of ear pieces;

each of said ear pieces having an elongate arm outwardly extending therefrom, each of said arms having a free end opposite the associated ear piece;

said free end of one of said ear pieces being pivotally coupled to one of said side regions of said cap, said free end of the another of said ear pieces being pivotally coupled to another of said side regions of said cap;

said arms each having a hole therethrough adjacent said free end of the respective arm;

a pair of generally hemispherical pivot studs each having a generally hemispherical arcuate face and a substantially planar and generally circular flat face;

said flat face of each pivot stud having an generally cylindrical extent outwardly extending therefrom at a center of the respective flat face;

said extent of each pivot stud terminating at a free tip and having a generally circular flange outwardly radiating therefrom and spaced apart from the tip of the respective extent and spaced apart the associated flat face of the respective pivot stud;

said extent of each pivot stud being extended through said hole of the associated arm such that the associated arm is positioned between said flange of the respective extent and the associated flat face of the respective pivot stud to permit free rotation of each arm about the associated extent;

each of said side regions of said cap having a hole extending therethrough and the associated reinforcing panel of the respective side region;

a first of said extents being inserted into said hole of a first of said side regions of said cap, a second of said extents being inserted into said hole of a second of said side regions of said cap;

said tip of each extent having a connecting bore therein;

a pair of connectors each having an insertion portion and a generally disk-shaped head portion;

said insertion portion of one of said connectors being inserted into said connecting bore of one of said extents, said insertion portion of another of said connectors being inserted into said connecting bore of another of said extents;

a first of said ear pieces having radio provided therein;

said first ear piece having a telescopically extendable antenna outwardly extending therefrom and electrically connected to said radio;

each of said ear pieces having a speaker for projecting a sound therefrom;

each of said ear pieces having an annular pad around said speaker adapted for abutting an ear region of a user, said pads of said ear pieces each comprising a resiliently deformable foamed material;

said radio being electrically connected to said speakers;

a first cable being electrically connected to and extended from said radio to said pivot stud of said arm of said first ear piece, said first cable having a free end extending into said connecting bore of extent of said pivot stud of said arm of said first ear piece;

a second cable having a first end extending into said insertion portion of a first of said connectors and a second end extending into said insertion portion of a second of said connectors;

said first end of said second cable being electrically connected to said free end of said first cable;

a third cable being electrically connected to and extended from said speaker of said second ear piece, said third cable having a free end extending into said connecting bore of extent of said pivot stud of said arm of said second ear piece; and said second end of said second cable being electrically connected to said free end of said second cable to electrically connect said speaker of said second ear piece to said radio.

* * * * *